United States Patent
Chen et al.

(10) Patent No.: US 8,411,606 B2
(45) Date of Patent: Apr. 2, 2013

(54) SYSTEM AND METHOD FOR INCORPORATING A LOW POWER MODE IN WIRELESS COMMUNICATION

(75) Inventors: Wei-Peng Chen, Santa Clara, CA (US); Chenxi Zhu, Gaithersburg, MD (US); Masato Okuda, Saitama (JP); Jonathan R. Agre, Brinklow, MD (US)

(73) Assignee: Fujitsu Limited, Kawasaki-shi (JP)

( * ) Notice: Subject to any disclaimer, the term of this patent is extended or adjusted under 35 U.S.C. 154(b) by 635 days.

(21) Appl. No.: 12/512,349

(22) Filed: Jul. 30, 2009

(65) Prior Publication Data

US 2010/0110979 A1    May 6, 2010

Related U.S. Application Data

(60) Provisional application No. 61/110,262, filed on Oct. 31, 2008.

(51) Int. Cl.
*G08C 17/00* (2006.01)
*H04B 1/16* (2006.01)
*H04W 72/00* (2009.01)

(52) U.S. Cl. ............ 370/311; 455/343.2; 455/453

(58) Field of Classification Search .......... 370/310–350; 455/327, 574, 343.1–343.6, 453; 709/200, 709/238–244
See application file for complete search history.

(56) References Cited

U.S. PATENT DOCUMENTS

| 2005/0054389 | A1* | 3/2005 | Lee et al. | 455/574 |
| 2005/0059437 | A1* | 3/2005 | Son et al. | 455/574 |
| 2007/0274244 | A1* | 11/2007 | Yoon et al. | 370/311 |
| 2011/0280170 | A1* | 11/2011 | Bowser et al. | 370/311 |

OTHER PUBLICATIONS

IEEE, IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer Society and the IEEE Microwave Theory and Techniques Society, IEEE Std 802.16e™-2005 and IEEE Std 802.16™-2004/Cor1-2005, Section 6. MAC Common part sublayer, title page thru xxvii and pp. 17-268, Feb. 28, 2006.

Lee, Doo Hwan, et al., "*Analysis of Ranging Process in IEEE 802.16e Wireless Access Systems*", *MobiWAC'06*, Torremolinos, Malaga, Spain, ACM 1-59593-488-X, pp. 172-179, Oct. 2, 2006.

(Continued)

*Primary Examiner* — Habte Mered
(74) *Attorney, Agent, or Firm* — Baker Botts L.L.P.

(57) ABSTRACT

According to one embodiment, a method for wireless communication comprises providing, at a base station, a plurality of endpoints with access to a wireless network. The method also comprises the base station entering a low power mode, wherein the base station ceases to provide the plurality of endpoints with access to the wireless network while in the low power mode. In addition, the method comprises the base station transitioning to an active mode from the low power mode during a first predetermined time, wherein the first predetermined time is identified by the base station and at least one endpoint before the base station transitions to the active mode. Further, if the base station receives a request to access the wireless network from at least one endpoint after transitioning to the active mode during a second predetermined time, the method comprises the base station remaining in the active mode. If the base station does not receive a request to access the wireless network from at least one endpoint after transitioning to the active mode during the second predetermined time, the method comprises the base station transitioning to the low power mode.

28 Claims, 5 Drawing Sheets

OTHER PUBLICATIONS

Barker, Elaine, et al., NIST Special Publication 800-90, "*Recommendation for Random Number Generation Using Deterministic Random Bit Generators (Revised)*" Computer Security Division, Information Technology Laboratory, National Institute of Standards and Technology, Technology Administration, U.S. Department of Commerce, 133 pages, Mar. 2007.

Kobayashi, Kazuhiko, et al., "*Novel Compact RF Module for Mobile WiMAX Terminal Equipment*", Fujitsu Sci. Tech. J., 44, 3, pp. 239-248, Jul. 2008.

European Patent Office Communication, European Search Report and Annex to the European Search Report; Application No. 09174392.2-2412; Ref. P113879EP00/FWW dated Mar. 15, 2010; 7 pages.

\* cited by examiner

SYSTEM AND METHOD FOR INCORPORATING A LOW POWER MODE IN WIRELESS COMMUNICATION

RELATED APPLICATION

This application claims benefit under 35 U.S.C. §119(e) of U.S. Provisional Application Ser. No. 61/110,262, entitled "IMPROVED FEMTO BASE STATION IDLE AND SLEEP MODES," filed Oct. 31, 2008, by Wei-Peng Chen et al.

TECHNICAL FIELD

This invention relates generally to wireless communication and more particularly to a system and method for incorporating a lower power mode in wireless communication.

BACKGROUND

Wireless communication systems have suffered from problems of interference and power consumption. Providing consistent service has been accomplished by having devices constantly send out signals advertising the availability of communication. In certain situations, this is may be a wasteful use of resources. This type of operation may also decrease the quality of the provided service as the amount of service providers increase and collisions occur.

SUMMARY

According to one embodiment, a method for wireless communication comprises providing, at a base station, a plurality of endpoints with access to a wireless network. The method also comprises the base station entering a low power mode, wherein the base station ceases to provide the plurality of endpoints with access to the wireless network while in the low power mode. In addition, the method comprises the base station transitioning to an active mode from the low power mode during a first predetermined time, wherein the first predetermined time is identified by the base station and at least one endpoint before the base station transitions to the active mode. Further, if the base station receives a request to access the wireless network from at least one endpoint after transitioning to the active mode during a second predetermined time, the method comprises the base station remaining in the active mode. If the base station does not receive a request to access the wireless network from at least one endpoint after transitioning to the active mode during the second predetermined time, the method comprises the base station transitioning to the low power mode.

In some embodiments, the method may further include coupling the base station to a network access device, the network access device providing the base station access to the wireless network via an Internet service provider network. The method may further include providing the plurality of endpoints with access to the wireless network utilizes the Internet service provider network, wherein the wireless network comprises a wireless service provider network. The method may also include the base station transitioning from the low power mode to the active mode in response to receiving a message from the wireless network indicating that the base station needs to communicate with at least one endpoint. In addition, the method may include the base station notifying the wireless network of the transition from the active mode to the low power mode such that the wireless network may update network load information.

According to one embodiment, a system for wireless communication comprises a radio operable to provide a plurality of endpoints with access to a wireless network. The radio is also operable to cease providing the plurality of endpoints with access to the wireless network while a base station is in a low power mode. In addition, the radio is operable to receive at least one ranging code from at least one endpoint. The system also comprises at least one processor operable to determine that at least one of the received ranging codes corresponds to at least one ranging code of a predetermined set of ranging codes. The at least one processor is also operable to cause the base station to exit the low power mode in response to determining that at least one received ranging code corresponds to at least one predetermined ranging code.

Depending on the specific features implemented, particular embodiments may exhibit some, none, or all of the following technical advantages. Entering the low power mode may save energy consumption. Entering the low power mode may also reduce interference on the wireless network. The impact of service disruption due to entering a low power mode may be reduced by monitoring ranging codes so that a transition from a low power mode to an active mode may occur when there is a need for service. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
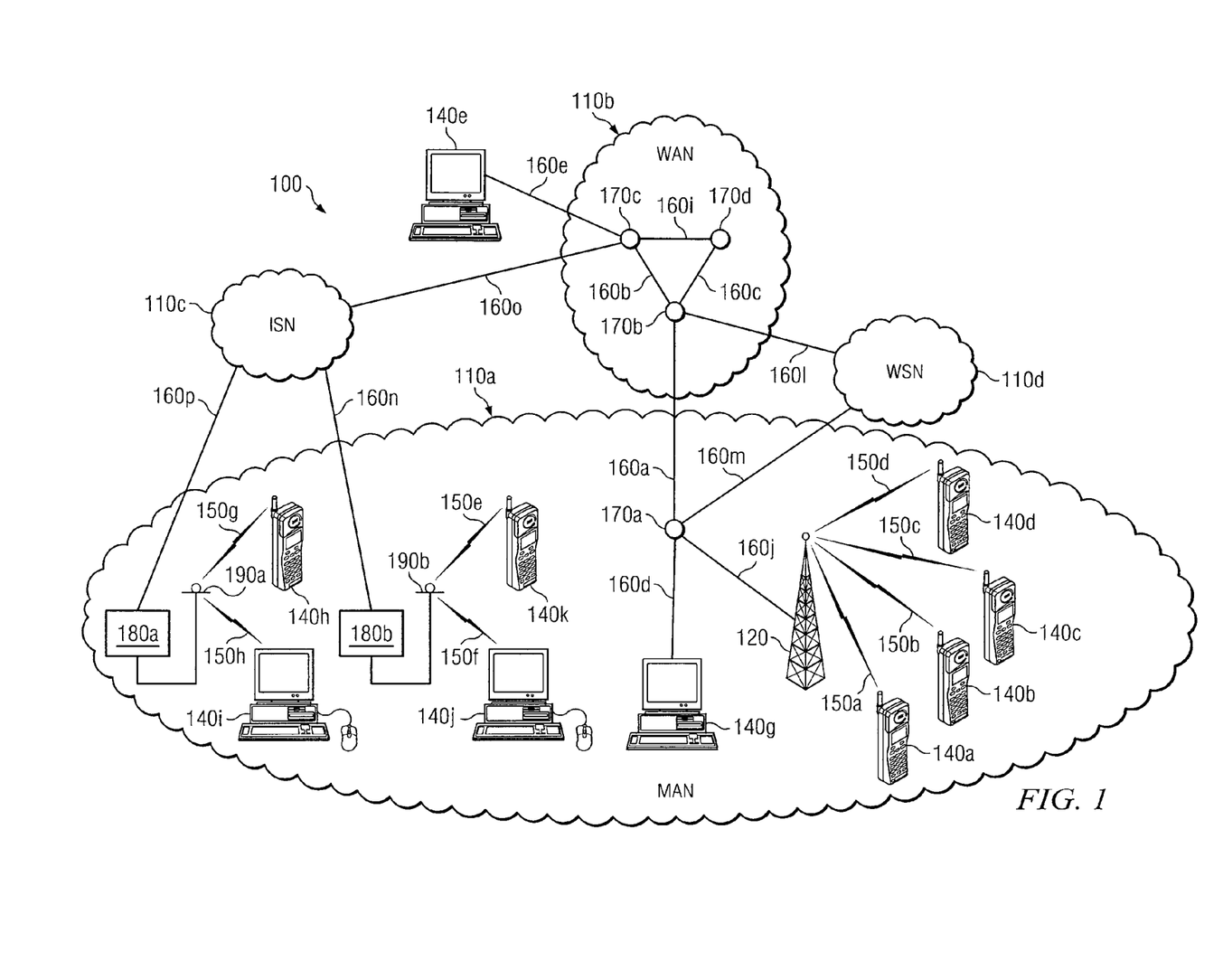
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access, via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an IEEE 802.16 based wireless network, popularly known as WiMAX, which may include macro base stations (mBSs), such as mBS 120, and femto base stations (fBSs), such as fBSs 190. Each of these components may provide endpoints 140 with access to one or more of networks 110 utilizing wireless connections 150.

For simplicity and ease of discussion, the remainder of this description may use a simplified nomenclature for the various entities that may be involved. 'Owner' may refer to the entity that has purchased an fBS or to whom the fBS is registered. 'User' may refer to the entity to whom a wireless service is being provided. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection (as further described below). 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

In the embodiment depicted in FIG. 1, network 110a includes fBSs 190. fBSs 190 may, in essence, be small base stations purchased (or leased) by the owner from the WSP. The owner is then responsible for installing the fBS, for example, at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS). In the scenario depicted in FIG. 1, fBSs 190 are connected to network access devices 180. This connection may provide fBSs 190 with backhaul connections to the WSP's network, WSN network 110d. Network access device 180 may provide the owner with general Internet access. fBSs 190 do not use dedicated backhaul communication lines associated with the WSP, but rather use the owner's existing Internet access. Depending on the embodiment and scenario, the ISP and the WSP may be the same entity.

In some embodiments, endpoints 140 may be configured to initiate a communication session with fBSs 190 by utilizing ranging codes and ranging slots. One or more ranging codes may be transmitted in one or more ranging slots from an endpoint to a fBS. The fBS may receive the one or more ranging codes and determine that it will enter into a communication session with the endpoint that transmitted the ranging code(s). In various embodiments, ranging codes may comprise a variety of different types of encoding schemes. For example, a ranging code may include a series of binary numbers; the ranging code may also be a symbol such as a QAM (Quadrature Amplitude Modulation) symbol or a QPSK (Quadrature Phase-Shift Keying) symbol. Ranging slots may represent a timing parameter or a frequency parameter associated with the ranging code. For example, ranging codes may be sent in specific timeslots when communicating with the fBS. As another example, the ranging codes may be communicated on a particular frequency or set of sub-frequencies. In a WiMAX protocol, the endpoint may send CDMA (Code Division Multiple Access) codes on an uplink frame dedicated for that purpose to the fBS.

Fixed-mobile convergence (FMC) is the scenario where users can enjoy service continuity and service integration when they roam between outdoor and indoor environments. fBSs 190 may facilitate FMC by allowing endpoints 140 to use a single wireless interface. More specifically, once fBS 190b, for example, is installed in the owner's home he is able to use the same mobile device with the same wireless interface to connect to either mBS 120 outside or fBS 190b inside. The selection of which device to connect to can be made manually by the user or autonomously by endpoint 140k, BS 120, or any component coupled to or controlled by WSN network 110d. In some embodiments, certain endpoints 140 may be able to transition between an mBS 120 and an fBS 190 (a "handover") in a manner that does not interrupt an active communication session occurring at endpoints 140. Handover may occur with assistance from nodes within network 110d. For example, such nodes may transmit identifiers for an mBS 120 that an fBS 190 should use for handing over an endpoint 140.

An increase in the number of wireless connections 150 within a given area may increase the impact and severity of interference between wireless connections 150. This may cause a decrease in quality of service (QoS) and an increase in maintenance costs. This may be of particular concern with respect to a large rollout of fBSs 190. More specifically, because the owner installs the fBS, there is no way for the WSP to perform any prior frequency planning and/or site surveillance. As the number of deployed fBSs increase, problems of interference may arise. For example, each fBS may periodically broadcast opportunities for endpoints to communicate in the wireless network. Such broadcasts, when multiplied across various fBSs and BSs, may interfere with the various base stations (such as fBSs or BSs) in the network. In order to alleviate this situation, in some embodiments, an fBS may be configured to enter into a low power mode. In the low power mode, the fBS may be configured to cease from periodically broadcasting opportunities for endpoints to communicate with the wireless network. This may be done, for example, in a situation where the fBS detects that endpoints have left its coverage area such that there are no endpoints in its coverage area. In various embodiments, the fBS may also enter a low power mode when it detects that the endpoints within its coverage area have also entered into a low power mode and are no longer attempting to communicate with the wireless network. As discussed further below, the fBS may leave the low power mode and enter into an active mode when it is desirable for any endpoint within its coverage area to communicate with the wireless network. Further details of the operation and advantages regarding various embodiments of a low power mode are described below with respect to FIGS. 2-4.

Although the example communication system 100 of FIG. 1 includes six different networks, networks 110a-110d, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b a WAN (e.g., a long range optical network or the Internet); network 110d is a wireless service network (WSN) which may be operated by the WSP responsible for providing network 110a with wireless service (e.g., WiMAX); and network 110c is an Internet service network (ISN) which may be operated by the ISP responsible for providing its users with Internet access. Though not depicted in FIG. 1, both WSN network 110d and ISN network 110c may include servers, modems, gateways and any other components that may be needed to provide their respective service.

While networks 110 have been depicted as four separate networks, depending on the scenario any two, or more, of the networks may be a single network. For example, the WSP and the ISP may be the same business entity which may maintain the necessary components for both services on the same network thus merging ISN network 110c and WSN network 110d into a single network. Furthermore, the interconnections between networks 110 may vary from those depicted in FIG. 1.

Generally, networks 110a-d provide for the communication of packets, cells, frames, or other portions of information (generally referred to as packets herein) between endpoints 140 and/or nodes 170 (described below). In particular embodiments, networks 110a-d may be IP networks. IP networks transmit data by placing the data in packets and sending each packet individually to the selected destination, along one or more communication paths. Any of networks 110a-110d may be coupled to other IP networks including, but not limited to, the Internet. Because IP networks share a common method of transmitting data, signals may be transmitted between devices located on different, but interconnected, IP networks. In addition to being coupled to other IP networks, any of networks 110a-d may also be coupled to non-IP networks through the use of interfaces or components such as gateways.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more fBSs, in certain cases, may allow network 110a to cover the larger geographic area associated with a MAN while using a relatively small number of wired links. More specifically, by properly arranging mBS 120 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of network 110d, any network components not capable of establishing a wireless connection, and/or other networks outside of the MAN, such as the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's Internet access, provided by the owner's ISP via the ISP's network (e.g., network 110c), for its backhaul connection to the WSP's network (e.g., network 110d).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
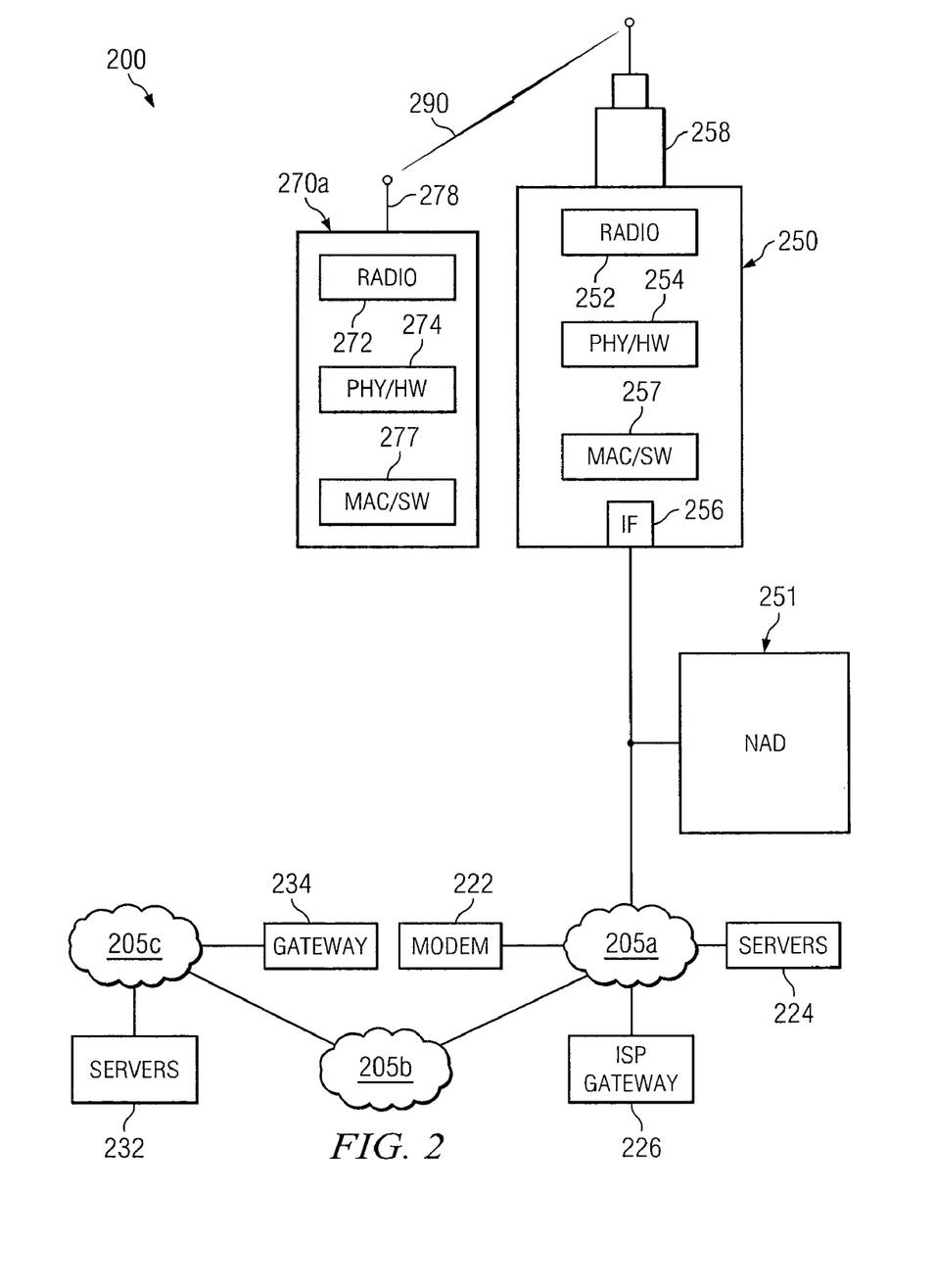
FIG. 2 illustrates one embodiment of a wireless network comprising an endpoint, a femto base station, and a network access device.

FIG. 2 illustrates a wireless network comprising a more detailed view of a system 200 including endpoint 270, network access device 251, and fBS 250, in accordance with a particular embodiment. The depicted embodiment is a simplified scenario comprising networks 205, fBS 250, network access device 251, and endpoint 270. In various embodiments, system 200 may comprise any number of wired or wireless networks, mBSs, endpoints, fBSs, and/or any other components that may facilitate or participate in the communication of data and/or signals whether via wired or wireless connections. Endpoint 270 and fBS 250 comprise PHY/HW blocks 274 and 254, MAC/SW blocks 277 and 257. fBS 250 further comprises communication interface 256. Endpoint 270 and fBS 250 also include radios 272 and 252 and antennas 278 and 258. These components may work together in order to provide wireless networking functionality, such as providing endpoints with wireless connections in a wireless network (e.g., a WiMAX wireless network). In some embodiments, PHY/HW blocks 254 and 274 comprise components and hardware operable to interact with a physical layer of a communication protocol. MAC/SW blocks 257 and 277 may comprise components and software operable to interact with a medium access control layer of a communication protocol. More details regarding aspects and components of FIG. 2 are provided below.

Networks 205 may comprise separate but interconnected networks operated by one or more different operators. More specifically, network 205a may be the ISP's network, network 205b may be a public network (e.g., the Internet), and network 205c may be the WSP's network. The owner of fBS 250 may use network 205a for Internet access. In providing the owner with network access, the ISP's network 205a may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205a and the owner's network access device 251. In particular embodiments, modems 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b.

Network 205c may be a WiMAX service provider's network. Depending on the scenario, network 205c may be the user's or the owner's WiMAX service provider's network. In providing the WiMAX service, network 205c may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205c with network 205b.

Networks 205a and 205c may be coupled via network 205b. In some embodiments, network 205b may be the Internet. Thus, in such embodiments, fBS 250 may connect to the WSP's network, network 205c, via the Internet. Though network 205b is depicted as a single network, it may comprise any number of the networks described above with respect to FIG. 1. For example, network 205b may comprise the Internet, a LAN, WAN, MAN, PSTN or some combination of the above.

PHY/HW blocks 254 and 274 may include any hardware needed for the operation of fBS 250 and endpoint 270, respectively. For example, PHY/HW blocks 254 and 274 may each comprise one or more processors as well as analog-to-digital and digital-to-analog converters. Each processor may be a microprocessor, controller, application specific integrated circuit (ASIC), field programmable gate array (FPGA), or any other suitable computing device, resource, or combination of hardware, software and/or encoded logic operable to provide, either alone or in conjunction with other components (e.g., memory), wireless networking functionality. Such functionality may include providing various wireless features discussed herein. For example, one or more of the processors within PHY/HW block 254 may be able to cause fBS 250 to enter into a low power mode and provide support for determining when fBS 250 enters an active mode from the low power mode.

In some embodiments, PHY/HW block 254 may include one or more correlators. Correlators may be a discrete component or their functionality may be provided by using a combination of the hardware described above. The correlators may operate by comparing received signals to predetermined symbols and outputting a value based on the degree of similarity between the received signals and the predetermined symbols. More details regarding these and other embodiments are given below with respect to FIGS. 2A-4.

PHY/HW blocks 254 and 274 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by fBS 250 and endpoint 270, respectively, including software embedded in a computer readable medium, and/or encoded logic incorporated in hardware or otherwise stored (e.g., firmware). In various embodiments, the memory modules may store information and/or instructions regarding protocols and parameters for how fBS 250 may enter and leave a low power mode.

MAC/SW blocks 257 and 277 may include any software, logic, or other information needed for the operation of fBS 250, and endpoint 270, respectively. In particular embodiments, the software, logic or other information may be stored within the memory modules of PHY/HW blocks 254 and 274. For example, MAC/SW block 254 may comprise, in various embodiments, information and/or instructions regarding protocols and parameters for how fBS 250 may enter and leave a low power mode.

Radios 252 and 272 may be coupled to or be a part of antennas 258 and 278, respectively. Radios 252 and 272 may receive digital data that is to be sent out to other mBSs, fBSs, and/or endpoints via a wireless connection. More information regarding example operations of the radios may be understood by examining the FIGS. 2A-4 and their respective descriptions.

In some embodiments, there may be various sources of power consumption during the operation of fBS 250. For example, PHY/HW block 254 and MAC/SW block 257 (or their equivalents in various embodiments) may process uplink and downlink frames. The processors operating in such portions consume energy. In addition, analog-to-digital converters (ADCs) and digital-to-analog converters (DACs) may be used in an fBS during communication and consume power. An fBS may also include RF circuitry which may include items such as amplifiers, mixers, modulators, filters, and other suitable components. Such items also consume power. An fBS may enter into a low power mode to conserve energy by reducing or stopping the power consumption of any combination or all of the discussed components.

Antennas 258 and 278 may be any type of antenna capable of transmitting and receiving data and/or signals wirelessly. In some embodiments, antennas 258 and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 252 and antenna 258, and radio 272 and antenna 278 may each form a wireless interface.

Communication interface 256 may be used for the wired communication of signaling and/or data between fBS 250 and networks 205. For example, communication interface 256 may comprise an interface (e.g., RJ-45) that is compatible with a corresponding interface on network access device 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via network access device 251, to provide the backhaul connection to network 205c, as opposed to the WiMAX service provider supplying the backhaul connection.

Network access device 251 may be used to provide the owner with Internet access. fBS 250 may utilize the Internet access for its backhaul connection to WiMAX network 205c. Depending on the type of network service and/or the user's service provider, network access device 251 may be a cable modem, a digital subscriber line (DSL) modem, a fiber optic modem, or any other modem, gateway or network access device provided by the owner's network service provider. The owner may have any number of routers, switches and/or hubs between fBS 250 and network access device 251.

As part of establishing a backhaul connection, fBS 250 may communicate with network access device 251. Network access device 251, which may be provided or authorized by the user's ISP, may provide fBS 250 with access to the ISP's network 205a which may then allow access to network 205c, via network 205b. Accessing network 205a may involve modem 241 communicating with the ISP's modems 222.

The ISP may operate one or more servers 224 (e.g., OAM&P, AAA, DHCP servers) in providing the user with Internet access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the user has a valid WiMAX account and that network 205c is able to communicate with other networks, such as network 205b. Servers 232 may also contain information, data, instructions and/or logic that may be used to provision various features and functionality of fBS 250. For example, they may provide fBS 250 with channel information for its wireless connection 290 with endpoint 270.

Endpoint 270 may be any type of wireless endpoint able to send and receive data and/or signals to and from fBS 250. Some possible types of endpoints 270 may include desktop computers, PDAs, cell phones, smart phones, laptops, and/or VoIP phones.

Figure 2A:
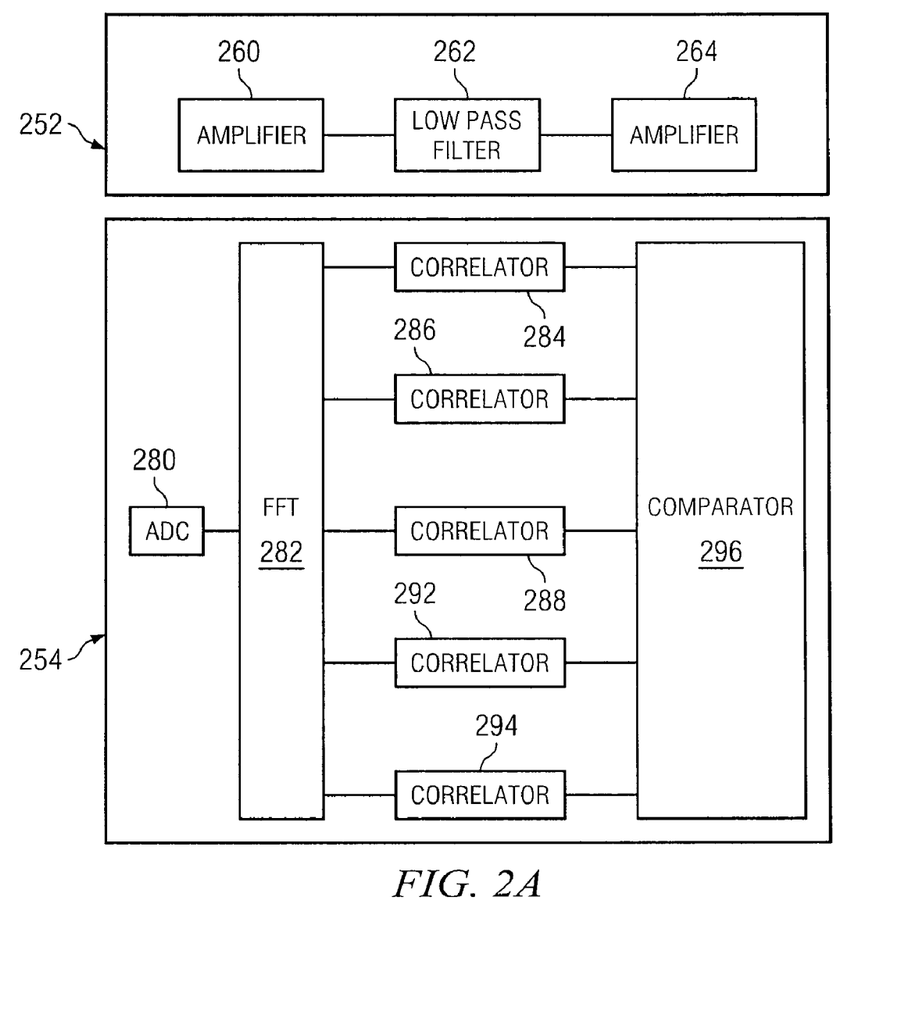
FIG. 2A illustrates one embodiment of certain components of the femto base station of FIG. 2.

FIG. 2A illustrates a more detailed view of one embodiment of radio 252 and PHY/HW 254. Radio 252 includes amplifier 260 that is coupled to low pass filter 262. The output of low pass filter 262 is coupled to amplifier 264. With such a configuration, radio 252 may amplify a received signal using amplifier 260, filter the received signal using low pass filter 262, and amplify the filtered signal using amplifier 264. The received signal may be represented as:

$$r(t) = \sum_{m=0}^{M-1} \sum_{i=0}^{SF-1} \sum_{k=0}^{N-1} C_m[i] \cdot A_{m,i}^k \cdot \alpha_{m,i}^k \cdot \exp\left\{ \begin{array}{c} j2\pi\left(f_c + \frac{i}{T_b}\right) \\ (t - t_{TDD}^m - \tau_{m,i}^k) \end{array} \right\} + n(t)$$

where: $C_m[i]$ is the ranging code at the ith subcarrier from the mth user of the M users transmitting ranging codes at ranging slot t; n(t) is the noise signal at slot t; SF is the number of subcarriers used in one ranging subchannel; N is the number of multipath propagation channels; $T_b$ is the OFDMA symbol duration; and $t_{TDD}$ represents transmission time delays. The channel model for ith subcarrier can be represented as:

$$h_{m,i}(t) = \sum_{k=0}^{N-1} A_{m,i}^k \cdot \alpha_{m,i}^k \cdot \exp\{j\phi_{m,i}^k\} \cdot \delta(t - \tau_{m,i}^k)$$

where: A is an attentuation factor; $\alpha$ is a random magnitude; exp{j} is a random phase; and $\tau$ is a multipath delay for the ith path.

PHY/HW 254 includes analog-to-digital converter 280, Fast Fourier Transform (FFT) 282, correlators 284-294, and comparator 296. PHY/HW 254 may receive the amplified signal from amplifier 264 and convert the signal to a digital format using ADC 280. The digital signal outputted from ADC 280 may be converted into a frequency domain using FFT 282. The output of FFT 282 may be sent to correlators 284-294. Correlators 284-294 may analyze the output of FFT 282 to determine if various codes or symbols (such as ranging codes) are present in the signal. Correlators 284-294 may output a signal indicating if codes or symbols have been detected. This may be done according to the following:

$$R = \max_{\Delta t} \sum_{i=0}^{SF-1} \int_{n \cdot T_b} r(t) \frac{C_m[i]}{T_b} \cdot \exp\left[\left\{j2\pi\left(f_c + \frac{i}{T_b}\right)(-\Delta t)\right\}^*\right] dt$$

where all possible transmission time delay and clock offset values are represented by $\Delta t$. R provides a value that accounts for correlation across multiple slots. The strength of the signal outputted by correlators 284-294 may be increased or decreased depending on the statistical likelihood of correctly identifying codes or symbols present in the signal. Comparator 296 may determine if the detected symbols or codes as determined by correlators 284-294 are symbols or codes expected by fBS 250 during a low power mode and output a signal indicating that the detected symbols or codes match the expected symbols or codes. Comparator 296 may also be configured to send a signal that may modify the amount of amplification provided by amplifiers 260 and 264.

Thus far several different embodiments and features have been presented. Particular embodiments may combine one or more of these features depending on operational needs and/or component limitations. This may allow for great adaptability of network 200 to the needs of various organizations and users. The following examples may help to illustrate how these components inter-work with one another to provide the functionality of particular embodiments.

In some embodiments, fBS 250 may provide endpoint 270 with access to network 205c. At some point, endpoint 270 may leave the coverage area of fBS 250. Or, in other situations, endpoint 270 may enter into a low power mode (such as an idle or sleep mode), such that endpoint 270 no longer needs to communicate with network 205c. In such and other situations, fBS 250 may determine to enter a low power mode. In some embodiments, fBS 250 may stop transmitting opportunities for endpoints, such as endpoint 270, to enter into a communication session with fBS 250. fBS 250 may also, or in the alternative, reduce the amplification of received signals utilizing antenna 258 and radio 252. For example, fBS 250 may reduce the amplification levels (in some situations, down to zero) in amplifiers 260 and 264. While in the low power mode, fBS 250 may periodically enter into an active mode wherein fBS 250 both transmits and receives signals and determines if fBS 250 should remain in the active mode or return to the low power mode. This determination may be based on whether there are endpoints within the coverage area of fBS 250 that desire to enter into a communication session with fBS 250. Timing parameters and clock information may be stored and processed by PHY/HW block 254 and/or MAC/SW block 257. The extent to which energy may be conserved in a low power mode may differ between different low power modes. For example, more energy may be conserved in an idle mode than in a sleep mode. In an idle mode, fBS 250 may be configured to exit the low power mode and receive signals less frequently than in a sleep mode. In particular embodiments, while in an idle mode, fBS 250 may reduce or remove power from one or more components that it does not do so while in a sleep mode. Such components may include oscillator circuit(s) of the transmitter in PHY/HW block 254 or radio 252. Further details and variations of these embodiments are described below with respect to FIG. 3.

In some embodiments, fBS 250 may determine to exit the low power mode by receiving one or more ranging codes. When entering into the low power mode, the fBS 250 may be configured to reduce the amplification of amplifiers 260 and 264. If an endpoint desires to enter into a communication session with fBS 250, the endpoint may send a ranging code in a ranging slot to fBS 250. Utilizing radio 252, fBS 250 may detect the transmitted ranging code(s) and determine if the received ranging code corresponds to a predetermined set of ranging codes utilized for entering into a communication session when fBS 250 is in a low power mode. If the received ranging codes correspond to the predetermined ranging codes, fBS 250 may determine to enter into an active mode and provide a communication session with the endpoint that transmitted the ranging code (such as endpoint 270). In various embodiments, fBS 250 may be configured to receive multiple ranging codes from an endpoint that desires a communication session wherein after receiving each ranging code the fBS 250 is configured to increase the amplification of amplifiers 260 and 264. One advantage provided in such embodiments is that fBS 250 may be able to determine false positives without having to fully enter into an active mode thus conserving power and reducing interference with other base stations. Further details of these embodiments and others are provided below with respect to FIG. 4.

Thus far several different embodiments and features have been presented. Particular embodiments may combine one or more of these features depending on operational needs and/or component limitations. This may allow for great adaptability of network 200 to the needs of various organizations and users.

Figure 3:
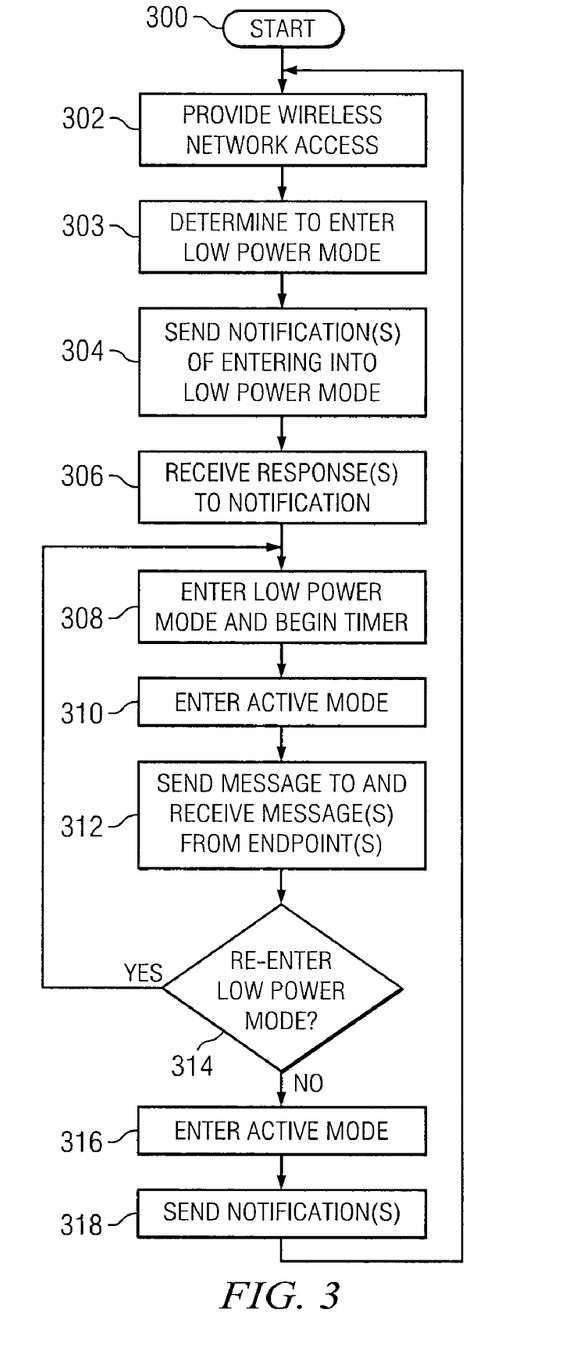
FIG. 3 is a flowchart illustrating one embodiment of a femto base station entering and exiting a low power mode using time intervals.

FIG. 3 is a flowchart illustrating one embodiment of a femto base station (fBS), such as fBS 250, entering and exiting a low power mode using time intervals. In general, the steps illustrated in FIG. 3 may be combined, modified, or deleted where appropriate, and additional steps may also be added to the example operation. Furthermore, the described steps may be performed in any suitable order.

At step 302, a fBS may be in a communication session with one or more endpoints. The fBS may provide the endpoints with access to a wireless network through a backhaul connection. During this communication session, one or more of the endpoints may leave the coverage area of the fBS. In addition, some of the endpoints may enter into a low power mode (such as an idle or sleep mode) in which they do not communicate with the fBS. In response to such activity by the endpoints or other activity by the endpoints, the fBS may determine to enter into a low power mode at step 303. For example, if there are no endpoints within the coverage area of the fBS, the fBS may then determine to enter into the low power mode. As another example, if all of the endpoints within the coverage of the fBS have entered into a low power mode (such as a sleep mode or an idle mode) the fBS may enter into the low power mode. In some embodiments, the fBS may determine to enter the low power mode in response to a message from the wireless network. For example, the wireless network may inform the fBS that there are no endpoints in the coverage area of the fBS. The wireless network may also send a message requesting that the fBS enter into the low power mode due to other considerations, such as network interference levels.

At step 304, the fBS may send one or more notifications to various nodes of the wireless network that it is going to enter into a low power mode. The fBS may send a message to the endpoints within its coverage area that it is entering into a low power mode. The fBS may also send a notification to a node within the wireless network that it is entering into a low power mode. Such a node may be an ASN-GW (access service network-gateway). The fBS may send such notifications to the wireless network so that entities within the wireless network may have an accurate representation of the communication sessions occurring within the wireless network, including the network load. With such information, entities within the wireless network receiving such notifications from an fBS may be able to more efficiently manage the resources within the wireless network. In some embodiments, the fBS may send a FEMTO_SLP-REQ message, such as when operating in a WiMAX network. In various embodiments, the fBS may also send a FEMTO_SLP-REQ message to an entity within the wireless network, such as an ASN-GW. The FEMTO_SLP-REQ message may be structured similarly to the MOB_SLP-REQ message in the WiMAX protocol but it may indicate that it originates from an fBS. At step 306, the fBS may receive one or more responses to the one or more notifications sent at step 304. Both the endpoints and the entities within the wireless network that the fBS transmitted the notification of entering into the low power mode may respond acknowledging that they have received the notification. The responses may also serve to synchronize entities such as the endpoints within the coverage area of the fBS. As discussed further below with respect to steps 308, 310 and 312, such synchronization may be useful in determining how and when the fBS will exit the low power mode and enter into an active mode.

At step 308, the fBS may enter the low power mode and begin a timer that will determine when the fBS will exit the low power mode. For example, the fBS may remain in the low power mode for a predetermined interval of time and then may exit the low power mode to determine if endpoints would like to enter into a communication session with the fBS. The timer used for the predetermined intervals may be synchronized with endpoints within the coverage area of the fBS by utilizing the responses received at step 306. Once the fBS is in the low power mode, it may alter its operation in one or more respects. For example, it may cease to transmit some information on the wireless network. In some embodiments, the fBS may cease to transmit preambles during frames of the communication session. Another example of the changes in behavior of the fBS while in the low power mode is reducing the gain applied by amplifiers to received signals. The interval during which the fBS remains in the low power mode may be determined by the fBS in response to the state of the endpoints within the coverage area of the fBS. For example, one or more of the endpoints may be in a low power mode in which the endpoint may periodically listen for communication that is destined for that endpoint. The fBS may be configured to determine the interval based on when such endpoints will be listening for communication destined for those endpoints.

In some embodiments, the endpoints within the coverage area of the fBS may be in multiple types of low power modes. For example, one endpoint may be in an idle mode while another endpoint may be in a sleep mode. Being in these different low power modes may mean that the endpoints have a different interval at which they will enter into a listening mode for inbound communication. As a result, the fBS may determine the interval such that each of the different low power modes that the endpoints within its coverage area are in may be satisfied. Thus, the fBS will exit the low power mode when one interval of the endpoints has expired and then may also exit the low power mode when another interval of the endpoints expires.

At step 310, the fBS may exit the low power mode and enter into an active mode. This may occur in response to the expiration of a predetermined interval as described in step 308. In addition, the fBS may determine to enter into the active mode in response to communication received from the wireless network. For example, a server on the wireless network may send a message to the fBS instructing the fBS to enter into the active mode. This may be because the sever on the wireless network is aware that a new endpoint will be entering into the coverage area of the fBS. Another reason that a server on the wireless network may send a request for the fBS to enter the active mode is that the wireless network may need to send information to one of the endpoints within the coverage area of the fBS. Also, the wireless network may determine that network congestion may be reduced if the fBS becomes available to provide service to endpoints currently being served by other base stations.

At step 312, in the active mode, the fBS may send a message to the endpoints within its coverage area. This message may indicate whether any of the endpoints have data that needs to be transmitted from the fBS to those endpoints. The message may also include other information about the wireless network or about the coverage area of the fBS. The message may also include timing parameters or other synchronization information regarding intervals during which the endpoints and/or the fBS will enter into a low power mode. The fBS may also receive messages from various endpoints within the coverage area during step 312. For example, the fBS may receive a message from one of the endpoints that it needs to enter into a communication session with the fBS.

At step 314, the fBS may determine whether or not it will reenter the low power mode. This determination may be dependent upon the activity the fBS participates in at steps 310 or 312. For example, if the fBS was notified by the network of information that needs to be transmitted to one or more of the endpoints, the fBS may determine not to enter into the low power mode so that it can transmit the information to the appropriate endpoint. In addition, the fBS may have received an indication from an endpoint at step 312 that the endpoint needs to enter into a communication session with the fBS. In such a case, the fBS will not reenter into the low power mode so that it can participate in a communication session with that endpoint. If the fBS determines that such activity will not be required, the fBS may determine to reenter the low power mode and may proceed to step 308.

In some embodiments, the fBS may determine to reenter the low power mode in response to a predetermined time interval expiring. For example, the fBS may determine to enter the active mode at step 310 for a limited time interval that may be predetermined. If the time interval expires without activity that would require the fBS to remain in the active mode occurring, the fBS may determine to reenter the low power mode and proceed to step 308.

The fBS may redetermine the amount and interval for which it will remain in the low power mode based upon the messages transmitted or received at step 312. The fBS may also determine to remain in the same interval as it had previously. The determination of the interval for which the fBS will remain in the low power mode may be determined upon the type of low power mode the endpoints within the coverage area of the fBS are in. For example, the endpoints may be in a sleep or idle mode which have different intervals during which the endpoints will leave those modes. The fBS may choose to incorporate these different intervals into its determination as to how long it will remain in a low power mode. If the fBS decides to not enter the low power mode it may proceed to step 316 where it enters an active mode.

At step 316, the fBS may enter an active mode. In this active mode, the fBS may both transmit and receive information within its coverage area. As discussed above, the fBS may enter step 316 because communication from the wireless network may need to be sent to an endpoint in the coverage area of the fBS. In addition, the fBS may enter step 316 due to a need to provide access to the wireless network for an endpoint requesting such access within its coverage area. Such a request may have been received at step 312 by the fBS. At step 318, the fBS may send one or more notifications to nodes of the network that it has entered the active mode. For example, the fBS may send one or more notifications to endpoints within its coverage area that it has entered an active mode. The fBS may also send one or more notifications to nodes in the wireless network that it has entered an active mode. For example, the fBS may send a notification to the ASN-GW within the wireless network that it has entered an active mode or other nodes within the wireless network that may utilize such notifications to facilitate their activity. This may provide more visibility for operators of the wireless network into the operations within the wireless network, including network load. Such visibility may provide the operators of the wireless network opportunity to more efficiently manage the resources of the wireless network. For example, the operators of the wireless network may be able to route endpoints to various base stations based on network loads at various points of the network. Once in the active mode, the fBS may return to step 302 and provide various endpoints access to the wireless network.

Figure 4:
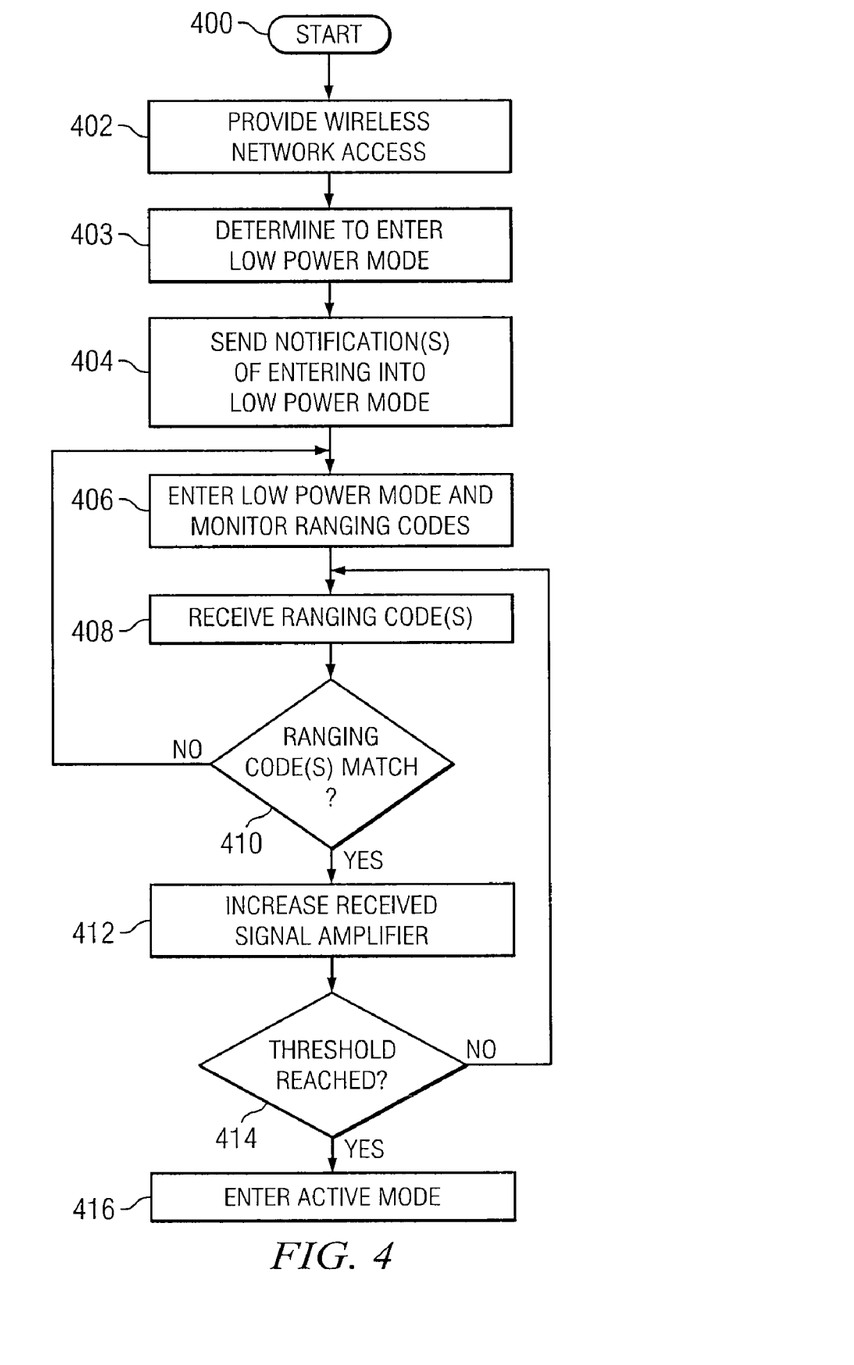
FIG. 4 is a flowchart illustrating one embodiment of a femto base station entering and exiting a low power mode using ranging codes.

FIG. 4 is a flowchart illustrating one embodiment of a femto base station (fBS), such as fBS 250, entering and exiting a low power mode using ranging codes instead of timing intervals as described in FIG. 3. As further described below, the use of ranging codes may reduce service disruption that is caused by a fBS entering a low power mode. In general, the steps illustrated in FIG. 4 may be combined, modified, or deleted where appropriate, and additional steps may also be added to the example operation. Furthermore, the described steps may be performed in any suitable order.

At step 402, an fBS may provide wireless access to one or more endpoints in its coverage area. The performance of step 402 may be similar to that of step 302. Variations in the performance of step 402 as compared to what is performed in step 302 may be suitable due to the performance of steps 404-416. Some examples of these variations may be discussed below.

At step 404, the fBS may send notifications to the endpoints within its coverage area that it is entering a low power mode. The fBS may also send one or more notifications to the entities within the wireless network (such as ASN-GW) that it is entering the low power mode. The fBS may send parameters to the endpoints within its coverage area that may be used by the endpoints to determine ranging codes and ranging slots. These ranging codes and ranging slots may be used by the endpoints to cause the fBS to exit the low power mode when, for example, the endpoints need to enter into a communication session with the fBS. Such parameters may include the actual ranging codes and ranging slots to be used. In some embodiments, such parameters may include information such as cryptographic information that the endpoints may use to be able to determine randomly generated ranging codes and ranging slots. This may be beneficial by providing more security to communication between the endpoints and the fBS. For example, the fBS may include cryptographically secure pseudorandom number generator (CSPRNG) credentials. The CSPRNG credentials may be randomly generated at the fBS and may be transmitted in an encrypted format such as using a traffic encryption key (TEK) or other forms of encryption. Endpoints that receive the CSPRNG credentials may then be able to generate the same random number that the fBS would generate based upon an agreed cryptographic algorithm. Suitable exemplary cryptographic algorithms may include those described in the Advanced Encryption Standard (AES), such as AES-128. The endpoints and fBS may use the CSPRNG credentials transmitted in the notifications as well as other entropy inputs such as a frame number, a clock value, a hardware identifier value of the fBS or other such inputs to generate the random number such that the random number is changed at every frame that is generated. In some embodiments, the fBS may transmit different CSPRNG credentials to each endpoint within its coverage area. However, the fBS may also transmit the same CSPRNG credentials to the endpoints within its coverage area. The ranging codes and slots may be determined based upon this generated random number in many ways. In one example, the ranging slot may be generated according to the first most significant byte of the generated random number while the ranging code may be generated according to the second most significant byte of the generated random number. For example, the ranging subchannel may be the first most significant byte of the random number modulo the total number of ranging subchannels while the ranging code may be the second most significant bye of the random number modulo the total number of ranging codes. The preceding only serves as one example of a host of different manners of using the generated random number to determine the ranging slots and codes.

At step 406, the fBS monitors for ranging codes transmitted by the endpoints in its coverage area while in a low power mode. During this time, the fBS may not be transmitting any information thus saving power as well as reducing interference with other base stations. The aspects of the fBS which process received signals may also be operating in a lower power state by, for example, reducing the amount of amplification applied to received signals. At step 408, the fBS may receive one or more ranging codes. The ranging codes may be transmitted by endpoints within the coverage area of the fBS. In some embodiments, the ranging codes may be sent by endpoints in a manner that takes into account communication that may be occurring from other nodes on the wireless network as well as clock drift present between the endpoints and the fBS. This may occur by sending the ranging codes $\epsilon$ symbols away from communication known to occur on the wireless network according to any suitable protocols, where $\epsilon$ represents the sum of tolerated clock drift between the endpoints and the fBS. For example, the ranging codes may be sent $\epsilon$ symbols away from when preamble symbols are to be sent in the WiMAX protocol. The endpoints may transmit the ranging codes in order to cause the fBS to initiate a communication session with the endpoints.

In order to identify which ranging codes have been received, the fBS may process the received signals in various manners. For example, the fBS may amplify a received signal and then pass the amplified signal to a low pass filter. The low pass filter may be used to reduce the amount of noise present in the signal. The fBS may then amplify the filter signal so as to increase the likelihood of proper protection of ranging codes that may be present in the signal. The fBS may accomplish these tasks using various hardware and software components. Such components may be similar to amplifiers 260 and 264 and low pass filter 262. The amplified, filtered signal may then be converted to a digital signal using an analog-to-digital converter such as ADC 280. The digital signal may be converted into the frequency domain using one or more elements such as FFT 282. The digital signal in the frequency domain may then be analyzed for any ranging codes present in the signal. In some embodiments this may occur using correlators such as correlators 284-294. The use of multiple correlators, each of which corresponding to one or more ranging codes, may provide faster processing of the received signal as ranging codes may be identified in parallel.

At step 410, the fBS may determine whether or not the detected ranging codes match the predetermined ranging codes. As discussed above, the predetermined ranging codes may be chosen when the fBS enters into the low power mode. The predetermined ranging codes may be determined randomly and dynamically. This may occur using a cryptographically secure random number generator. Once the fBS obtains the predetermined set of ranging codes, a comparison is made between the detected ranging codes and the predetermined ranging codes. One or more elements such as comparator 296 may be used to make the comparison between the predetermined ranging codes and the detected ranging codes. If any of the detected ranging codes match any of the predetermined ranging codes the fBS may proceed to step 412. However, if the received signal did not contain any ranging codes that matched the predetermined ranging codes the fBS may return to step 406 and continue monitoring for transmitted ranging codes. In various embodiments, the fBS may proceed to step 416 instead of proceeding to steps 412 and 414 if the ranging codes match. The benefit of proceeding to steps 412 and 414, in some embodiments, is that the fBS may be able to avoid determining false positives regarding with respect to detecting ranging code(s) transmitted by an endpoint. The fBS, by proceeding through steps 412 and 414, may be configured such that it will receive multiple ranging codes from the same endpoint before determining to enter into an active mode. However, the fBS may determine to only receive one set of ranging codes that contain a match to a predetermined set of ranging codes and enter into the active mode as discussed further in step 416 without going through steps 412 and 414.

As discussed above, the ranging codes may be sent to the fBS across multiple ranging slots. As a result, in various embodiments, the fBS may determine that a match occurs only if the received ranging codes are transmitted in the appropriate ranging slots. This process may further be secured from error by ensuring that the delay time between each ranging code is the same. Such a determination may indicate that the ranging codes were sent by the same endpoint. These optional additions to this step may be used to determine if a match is present.

At step 412, in some embodiments, the fBS may increase the amplification level of one or more amplifiers in response to determining that a received ranging code matches with a predetermined ranging code. The one or more amplifiers whose amplification is being increased in this step may include amplifiers such as amplifiers 260 and 264. The amount of the increase of the amplification may be configurable. It may be desirable to reduce the amount of power the fBS consumes by increasing the amount of amplification by a relatively small amount. However, in various embodiments increasing the amplification level in a relatively large amount may be beneficial in that it may help to screen out false positives.

At step 414, the fBS may determine if the amplification level(s) has reached a predetermined threshold. This threshold may be set so that a desired probability of receiving the appropriate ranging codes is met. Thus, if the amplification levels have reached an amount that is greater than or equal to the threshold, the fBS may proceed to step 416. However, if the threshold has not been reached then the fBS may proceed to step 408. The following example may help to illustrate how this operation may proceed in various embodiments. The fBS may first receive a matching ranging code and then increase amplification by one level. The fBS may then wait to receive another ranging code that matches the predetermined set. After receiving this second matching ranging code, it may further increase the amplification level. But, this latter increase of the amplification level may still not be high enough to match the predetermined threshold. This allows for the fBS to receive multiple ranging codes at multiple levels of amplification which help to reduce the amount of false positives that the fBS may detect. The higher the threshold is set, the further reduced the probability will be of falsely identifying a received signal as a matching ranging code. Finally, the fBS may receive a third matching ranging code and increase the amplification level. This final increase of the amplification level may reach the threshold and the fBS may then proceed to step 416. The amount of the threshold and the amount of amplification may all be configured in varying degrees to develop a desired probability of correct detection of ranging codes.

At step 416, the fBS may enter into an active mode. In the active mode, the fBS may enter into communication sessions with the endpoints within its coverage area. The fBS may also resume periodically transmitting opportunities for endpoints to enter into a communication session. The fBS may also set the amplification of received signals to a normal level. In this manner, as described in steps 402 through 416, the fBS may be able to move from an active to a low power mode and then return to the active mode in response to an endpoint sending a signal such as a ranging code. This may be beneficial in that the fBS may be able to more quickly respond to the needs of endpoints and their desire to communicate while at the same time reducing the amount of network interference and power consumption.

Although several embodiments have been illustrated and described in detail, it will be recognized that modifications and substitutions are possible without departing from the spirit and scope of the appended claims.

What is claimed is:

1. A method for wireless communication, comprising:
   at a base station, providing a plurality of endpoints with access to a wireless network;
   at the base station, entering a low power mode, wherein the base station ceases to provide the plurality of endpoints with access to the wireless network while in the low power mode;
   at the base station, transitioning to an active mode from the low power mode during a first predetermined time, wherein the first predetermined time is identified by the base station and at least one endpoint before the base station transitions to the active mode;
   if the base station receives a request to access the wireless network from at least one endpoint after transitioning to the active mode during a second predetermined time, remaining in the active mode;
   if the base station does not receive a request to access the wireless network from at least one endpoint after transitioning to the active mode during the second predetermined time, transitioning to the low power mode; and
   notifying, by the base station, a node of an access service network associated with the wireless network of the transition from the active mode to the low power mode such that the wireless network updates network load information.

2. The method of claim 1, further comprising:
   coupling the base station to a network access device, the network access device providing the base station access to the wireless network via an Internet service provider network;
   wherein providing the plurality of endpoints with access to the wireless network utilizes the Internet service provider network; and
   wherein the wireless network comprises a wireless service provider network.

3. The method of claim 1, further comprising transitioning, at the base station, from the low power mode to the active mode in response to receiving a message from the wireless network.

4. The method of claim 1, further comprising notifying, by the base station, at least one endpoint of the transition from the active mode to the low power mode such that the endpoint may determine the first predetermined time in response to the notification.

5. The method of claim 1, wherein the wireless network comprises a WiMAX network.

6. A method for wireless communication, comprising:
   at a base station, providing a plurality of endpoints with access to a wireless network;
   at the base station, entering a low power mode, wherein the base station ceases to provide the plurality of endpoints with access to the wireless network while in the low power mode;
   at the base station, receiving at least one ranging code from at least one endpoint;

at the base station, determining that at least one of the received ranging codes corresponds to at least one ranging code of a predetermined set of ranging codes; and at the base station, exiting the low power mode in response to determining that at least one received ranging code corresponds to at least one predetermined ranging code.

7. The method of claim 6, wherein:

determining that at least one received ranging code corresponds to at least one predetermined ranging code further comprises:

(a) determining that a first received ranging code corresponds to a first predetermined ranging code;

(b) increasing the amplification of received signals at the base station in response to the determination in step (a) prior to exiting the low power mode; and (c) determining that a second received ranging code corresponds to a second predetermined ranging code, wherein the second received ranging code is received at the base station after increasing the amplification of received signals at the base station; and exiting the low power mode further comprises exiting the low power mode in response to the determination in step (c).

8. The method of claim 7, wherein:

determining that at least one received ranging code corresponds to at least one predetermined ranging code further comprises (d) determining that a time delay associated with the first received ranging code is approximately equal to a time delay associated with the second received ranging code; and wherein exiting the low power mode further comprises exiting the low power mode in response to the determinations in steps (c) and (d).

9. The method of claim 6, further comprising:

coupling the base station to a network access device, the network access device providing the base station access to the wireless network via an Internet service provider network;

wherein providing the plurality of endpoints with access to the wireless network utilizes the Internet service provider network; and wherein the wireless network comprises a wireless service provider network.

10. The method of claim 6, further comprising:

at the base station, transitioning from the low power mode to the active mode in response to receiving a message from the wireless network.

11. The method of claim 6, further comprising:

at the base station, notifying the wireless network of the transition from the active mode to the low power mode such that the wireless network may update network load information.

12. The method of claim 6, wherein the wireless network comprises a WiMAX network.

13. The method of claim 6, further comprising sending a notification from the base station to at least one endpoint indicating the transition from an active mode to a low power mode, wherein the notification comprises a cryptographic parameter that may be utilized to determine at least one predetermined ranging code.

14. The method of claim 6, wherein determining that at least one of the received ranging codes corresponds to at least one ranging code of a predetermined set of ranging codes further comprises determining that the ranging slot of the at least one ranging code corresponds to the ranging slot of the at least one predetermined ranging code.

15. A system for wireless communication comprising:

a radio operable to:

provide a plurality of endpoints with access to a wireless network;

cease providing the plurality of endpoints with access to the wireless network while a base station is in a low power mode; and receive a request to access the wireless network from at least one endpoint; and at least one processor operable to:

cause the base station to enter into the low power mode;

identify a first predetermined time;

cause the base station to transition from the low power mode to an active mode during the first predetermined time;

cause the base station to remain in the active mode after the transition from the low power mode to the active mode if the request is received during a second predetermined time;

cause the base station to transition from the active mode to the low power mode after the transition from the low power mode to the active mode if the request is not received during the second predetermined time; and cause the base station to notify a node of an access service network associated with the wireless network of the transition from the active mode to the low power mode such that the wireless network updates network load information.

16. The system of claim 15, further comprising:

an interface operable to:

couple the base station to a network access device, the network access device providing the base station access to the wireless network via an Internet service provider network wherein the wireless network comprises a wireless service provider network; and couple to the radio such that providing the plurality of endpoints with access to the wireless network utilizes the Internet service provider network.

17. The system of claim 15, wherein the at least one processor is further operable to cause the base station to transition from the low power mode to the active mode in response to the base station receiving a message from the wireless network indicating that the base station needs to communicate with at least one endpoint.

18. The system of claim 15, wherein the radio is further operable to notify at least one endpoint of the transition of the base station from the active mode to the low power mode such that the endpoint may determine the first predetermined time in response to the notification.

19. The system of claim 15, wherein the wireless network comprises a WiMAX network.

20. A system for wireless communication, comprising:

a radio operable to:

provide a plurality of endpoints with access to a wireless network;

cease providing the plurality of endpoints with access to the wireless network while a base station is in a low power mode; and receive at least one ranging code from at least one endpoint; and at least one processor operable to:

determine that at least that at least one of the received ranging codes corresponds to at least one ranging code of a predetermined set of ranging codes; and cause the base station to exit the low power mode in response to determining that at least one received ranging code corresponds to at least one predetermined ranging code.

21. The system of claim 20, wherein:
determining that at least one received ranging code corresponds to at least one predetermined ranging code further comprises:
  (a) determining that a first received ranging code corresponds to a first predetermined ranging code;
  (b) increasing the amplification of received signals at the base station in response to the determination in step (a) prior to exiting the low power mode; and
  (c) determining that a second received ranging code corresponds to a second predetermined ranging code, wherein the second received ranging code is received at the base station after increasing the amplification of received signals at the base station; and
causing the base station to exit the low power mode further comprises causing the base station to exit the low power mode in response to the determination in step (c).

22. The system of claim 21, wherein:
determining that at least one received ranging code corresponds to at least one predetermined ranging code further comprises (d) determining that a time delay associated with the first received ranging code is approximately equal to a time delay associated with the second received ranging code; and
causing the base station to exit the low power mode further comprises causing the base station to exit the low power mode in response to the determination in steps (c) and (d).

23. The system of claim 20, further comprising:
an interface operable to:
  couple the base station to a network access device, the network access device providing the base station access to the wireless network via an Internet service provider network wherein the wireless network comprises a wireless service provider network; and
  couple to the radio such that providing the plurality of endpoints with access to the wireless network utilizes the Internet service provider network.

24. The system of claim 20, wherein the at least one processor is further operable to cause the base station to transition from the low power mode to the active mode in response to the base station receiving a message from the wireless network indicating that the base station needs to communicate with at least one endpoint.

25. The system of claim 20, wherein the at least one processor is further operable to cause the base station to notify the wireless network of the transition from the active mode to the low power mode such that the wireless network may update network load information.

26. The system of claim 20, wherein the wireless network comprises a WiMAX network.

27. The system of claim 20, wherein the radio is further operable to send a notification from the base station to at least one endpoint indicating the transition from an active mode to a low power mode, wherein the notification comprises a cryptographic parameter that may be utilized to determine at least one predetermined ranging code.

28. The system of claim 20, wherein determining that at least one of the received ranging codes corresponds to at least one ranging code of a predetermined set of ranging codes further comprises determining that the ranging slot of the at least one ranging code corresponds to the ranging slot of the at least one predetermined ranging code.

* * * * *